United States Patent
Cujé et al.

(10) Patent No.: US 7,280,617 B2
(45) Date of Patent: Oct. 9, 2007

(54) METHOD TO COMPENSATE FOR A STEP DC DISTURBANCE IN A DIGITAL BASEBAND SIGNAL IN A HOMODYNE RADIO RECEIVER

(75) Inventors: Michael Cujé, München (DE); Stefan Eibl, Taufkirchen (DE); Stefan Herzinger, München (DE); Martin Krüger, München (DE); Xiaofeng Wu, Neubiberg (DE); Bin Yang, Herrenberg (DE)

(73) Assignee: Infineon Technologies AG (DE)

( * ) Notice: Subject to any disclaimer, the term of this patent is extended or adjusted under 35 U.S.C. 154(b) by 740 days.

(21) Appl. No.: 10/734,707

(22) Filed: Dec. 11, 2003

(65) Prior Publication Data

US 2004/0146128 A1 Jul. 29, 2004

Related U.S. Application Data

(63) Continuation of application No. PCT/DE02/02033, filed on Jun. 4, 2002.

(30) Foreign Application Priority Data

Jun. 11, 2001 (DE) ................. 101 28 236

(51) Int. Cl.
*H04L 25/10* (2006.01)
(52) U.S. Cl. .................................... 375/319
(58) Field of Classification Search ............... 375/319, 375/316, 130, 150, 147; 455/464, 67.13; 370/332, 333
See application file for complete search history.

(56) References Cited

U.S. PATENT DOCUMENTS

| | | | | |
|---|---|---|---|---|
| 3,818,348 A | 6/1974 | Puente | ....................... | 325/324 |
| 5,579,347 A | 11/1996 | Lindquist et al. | ........... | 375/346 |
| 5,838,735 A | 11/1998 | Khullar | ....................... | 375/319 |
| 6,115,593 A | 9/2000 | Alinikula et al. | ........... | 455/324 |
| 6,148,047 A | 11/2000 | Mohindra | ................... | 375/346 |
| 7,127,262 B2 * | 10/2006 | Hammes et al. | ............ | 455/464 |

FOREIGN PATENT DOCUMENTS

| | | |
|---|---|---|
| DE | 69226697 T2 | 10/1992 |
| DE | 4201194 A1 | 7/1993 |
| EP | 0594894 A1 | 10/1992 |
| WO | WO91/05427 | 4/1991 |
| WO | WO00/45523 | 8/2000 |
| WO | WO01/05025 A1 | 1/2001 |

OTHER PUBLICATIONS

E. Del Re, et al.; "A Within-Burst Adaptive MLSE Receiver for Mobile TDMA Cellular Systems"; Acoustics, Speech and Signal Processing, Mar. 1992, San Francisco, CA; pp. 493-496 vol. 4.

B. Lindquist, et al.; "A New Approach to Eliminate the DC Offset in a TDMA Direct Conversion Receiver"; Vehicular Technology Conference, May 1993, Lund, Sweden; pp. 754-757.

* cited by examiner

*Primary Examiner*—Khai Tran
(74) *Attorney, Agent, or Firm*—Dickstein, Shapiro, LLP.

(57) ABSTRACT

In a method to compensate for a step DC disturbance (1) in a baseband signal in a homodyne radio receiver, the time profile of the step DC disturbance within a burst is determined. In order to produce a step-corrected baseband signal, the determined time profile (2) is then calculated from the digitized baseband signal.

16 Claims, 4 Drawing Sheets

METHOD TO COMPENSATE FOR A STEP DC DISTURBANCE IN A DIGITAL BASEBAND SIGNAL IN A HOMODYNE RADIO RECEIVER

CROSS REFERENCE TO RELATED APPLICATION

This application is a continuation of copending International Application No. PCT/DE02/02033 filed Jun. 4, 2002, and claiming a priority date of Jun. 11, 2001, which designates the United States.

TECHNICAL FIELD OF THE INVENTION

The invention relates to a method to compensate for a step DC disturbance in a digital baseband signal in a homodyne radio receiver, in particular a homodyne mobile radio receiver.

DESCRIPTION OF THE RELATED ART

Homodyne mobile radio receivers have become ever more important in recent years. Since homodyne mobile radio receivers have no intermediate frequency stage, a greater degree of integration can be achieved on the chip, thus reducing the costs of the mobile radio receiver.

The main problem with the homodyne receiver architecture is that non-linearities in the radio-frequency (RF) receiver result in DC components occurring in the quadrature-demodulated signal at the output of the mixer stage, and these adversely affect the reception quality of the mobile radio receiver. These DC components are referred to in the following text, in accordance with normal spoken usage, as the DC (direct current) offset. The DC offset must be corrected during baseband signal processing, since it adversely affects the equalization of the received signal and leads to an increased bit error rate in the receiver.

In homodyne baseband receivers, the DC offset is normally assumed to be constant within a burst, is estimated and is corrected before equalization of the baseband signal from this. Difficulties occur in these methods when a relatively large step change occurs in the DC offset within one burst. In this situation, the estimate of the DC offset over a burst results in a mean value which corresponds neither to the DC offset before the step change nor to the DC offset after the step change. This results in poor equalization for this for this burst, and thus has a disadvantageous effect on the signal quality that can be achieved.

Analog circuit concepts for DC offset compensation in a homodyne receiver are proposed in the U.S. Pat. Nos. 6,115,593 and 6,148,047.

European Patent Application EP 0 594 894 A1 describes a method for offset correction in a TDMA (time division multiple access) receiver, in which the DC offset is corrected both in the analog area and in the digital area of the receiver, taking account of operating parameters such as the gain and reception frequency. The measurement time for determining the DC offset is at least one time slot.

The invention is based on the object of specifying a method which improves the reception quality of homodyne radio receivers.

SUMMARY OF THE INVENTION

This object can be achieved by a method to compensate for a step DC disturbance in a digital baseband signal in a homodyne radio receiver, comprising the following steps:

a) determining a time Tst at which the step DC disturbance occurs within a burst;
b) calculating various time profiles of the step DC disturbance for two or more times around Tst;
c) calculating these profiles from the digital baseband signal in order to produce the various step-corrected baseband signal versions;
d) evaluating the various step-corrected baseband signal versions which are obtained in this way, on the basis of a predetermined criterion; and
e) selecting one of the step-corrected baseband signal versions as a function of the evaluation result.

The following additional step can be carried out before step b):

estimating the magnitude of the step DC disturbance by separate evaluation of the baseband signal at the times before and after Tst;

wherein the calculation process in step b) takes the estimated magnitude of the step DC disturbance into account; and wherein the calculation in step c) is carried out by subtracting the calculated time profiles from the digital baseband signal, in order to produce the various step-corrected baseband signal versions.

The object can also be achieved by a method to compensate for a step DC disturbance in a digital baseband signal in a homodyne radio receiver, comprising the following steps:

a) determining a time Tst at which the step DC disturbance occurs within a burst;
b) evaluating the position of the Tst within the burst being considered;
c) deciding on the basis of the position of Tst and/or on the basis of which calculation rule whether the production of a step-corrected baseband signal should be carried out; and if a step-corrected baseband signal is to be generated, d) calculating the time profile of the step DC disturbance and calculating this profile from the digital baseband signal in order to produce the step-corrected baseband signal as a function of the calculation rule which was selected in step c).

Step d) may include the following steps:

d1) estimating the magnitude of the step DC disturbance by separate evaluation of the baseband signal at the times before and after Tst;
d2) calculating a time profile of the step DC disturbance taking into account the determined time Tst and the estimated magnitude of the step DC disturbance; and
d3) subtracting the calculated time profile of the step DC disturbance from the digital baseband signal, in order to produce the step-corrected baseband signal.

The above mentioned methods may further comprise the steps of:

predetermining first time intervals with a specific interval length at the start and/or at the end of the burst, and carrying out the correction for the step DC disturbance only when Tst is outside this first time interval.

When Tst is within a second time interval in the burst, the step-corrected baseband signal can be produced by means of various time profiles. The second time interval can be a time interval in which the training sequence occurs, the various step-corrected baseband signal versions can be correlated with the training sequence which is known in the receiver, and that step-corrected baseband signal version which has the best correlation result can be selected as the step-corrected baseband signal. The magnitude of the step DC disturbance can be calculated taking into account a guard time interval around the determined time Tst, with the baseband signal within the guard time interval being ignored in the estimate of the magnitude of the DC disturbance. The time profile or the time profiles of the step DC disturbance can be calculated on the basis of a first step model in which a sudden rise occurs in the step flank for a specific data symbol in the digital baseband signal. The time profile or the time profiles of the step DC disturbance can be calculated on the basis of a second step model, in which the step flank rises as a ramp function over a time period of two or more data symbols in the digital baseband signal.

The invention is accordingly based on the idea of determining the time profile of a step DC disturbance in the baseband signal in a homodyne radio receiver within a burst, and calculating a list from the baseband signal. This means that the step DC disturbance in the baseband signal is identified and is taken into account correctly (that is to say as a step-function profile) in the compensation process. This results in improved AM suppression, as will be explained in more detail in the following text.

One preferred refinement of the invention is characterized in that, in a first step, the time Tst at which the step DC disturbance occurs within a burst is determined. In a second step, the magnitude of the step DC disturbance is estimated. In a third step, a time profile is calculated for the step DC disturbance taking into account the determined time Tst and the estimated magnitude of the DC disturbance. The step DC disturbance is compensated for in a fourth step by subtraction of the calculated time profile of the DC disturbance from the digital baseband signal, thus resulting in the step-corrected baseband signal being produced.

The parameters which have been mentioned (the time Tst and the magnitude of the step DC disturbance) make it possible to take sufficiently accurate account, with an acceptable level of computation complexity, of the step disturbance within a burst for DC offset correction.

One particularly preferred embodiment of the method according to the invention is characterized in that the magnitude of the step DC disturbance is calculated taking into account a guard time interval around the determined time Tst, with the baseband signal within the guard time interval being ignored in the estimate of the magnitude of the DC disturbance. The guard time interval makes it possible to ensure that inaccuracies and uncertainties in the definition of Tst have no influence, or only a minor influence, on the result of the step magnitude estimate, because signal values for which it is impossible to preclude the possibility (owing to said uncertainty) that they belong to the flank area of the DC step, are generally ignored.

A further advantageous measure in the method according to the invention is to produce the step-directed baseband signal iteratively. This allows the accuracy of the disturbance compensation to be improved.

In this case, one advantageous iteration sequence is characterized in that this sequence comprises the following steps: calculation of time profiles of the step DC disturbance for two or more times around Tst, evaluation of the various step-corrected baseband signal versions which are obtained in this way, on the basis of a predetermined criterion, and selection of one of the step-corrected baseband signal versions as a function of the evaluation result.

Furthermore, other influencing variables can be taken into account in the process for compensating for DC disturbance according to the invention. In this context, one advantageous method variant of the invention is characterized in that the position of Tst within the burst under consideration is evaluated in a first step, and the evaluation result is used in a second step to decide whether and/or in accordance with which calculation rule, the step-corrected baseband signal will be produced. This makes it possible to switch between different method procedures as a function of the determined time Tst.

By way of example, the first time intervals with a specific interval length may be predetermined at the start and/or at the end of the burst, and the step DC disturbance may be corrected only when Tst is outside these first time intervals. This measure ensures that the step DC disturbance is not corrected when no particular improvement can be expected, because the DC step is located in the immediate vicinity of the burst start or of the burst end.

A further possible way to take into account the position of the DC step within a burst when carrying out the method according to the invention consists in that the step-corrected baseband signal is produced iteratively when Tst is within a second time interval in the burst. Since the iterative production of the step-corrected baseband signal allows an improvement in the reception quality of data symbols in the area of the step flank, this measure means that even signal components which are located "centrally in the disturbance" can have a DC offset step compensated for as well as possible.

This is particularly advantageous when the step DC disturbance occurs in a training sequence in the burst. In this situation, particularly accurate compensation for the step DC disturbance is necessary, since the training sequence is used for channel estimation and its accuracy in turn influences the quality of the equalization for the adjacent signal sections of the burst, which carry information.

BRIEF DESCRIPTION OF THE DRAWINGS

The invention will be explained in the following text using an exemplary embodiment and variants of it, and with reference to the drawing, in which:

FIG. 6 shows a flowchart for DC step compensation by means of various time profiles which are calculated in accordance with the first aspect of the invention, based on the step model with a sudden flank rise as shown in FIG. 5a.

DESCRIPTION OF PREFERRED EMBODIMENTS

Figure 1:
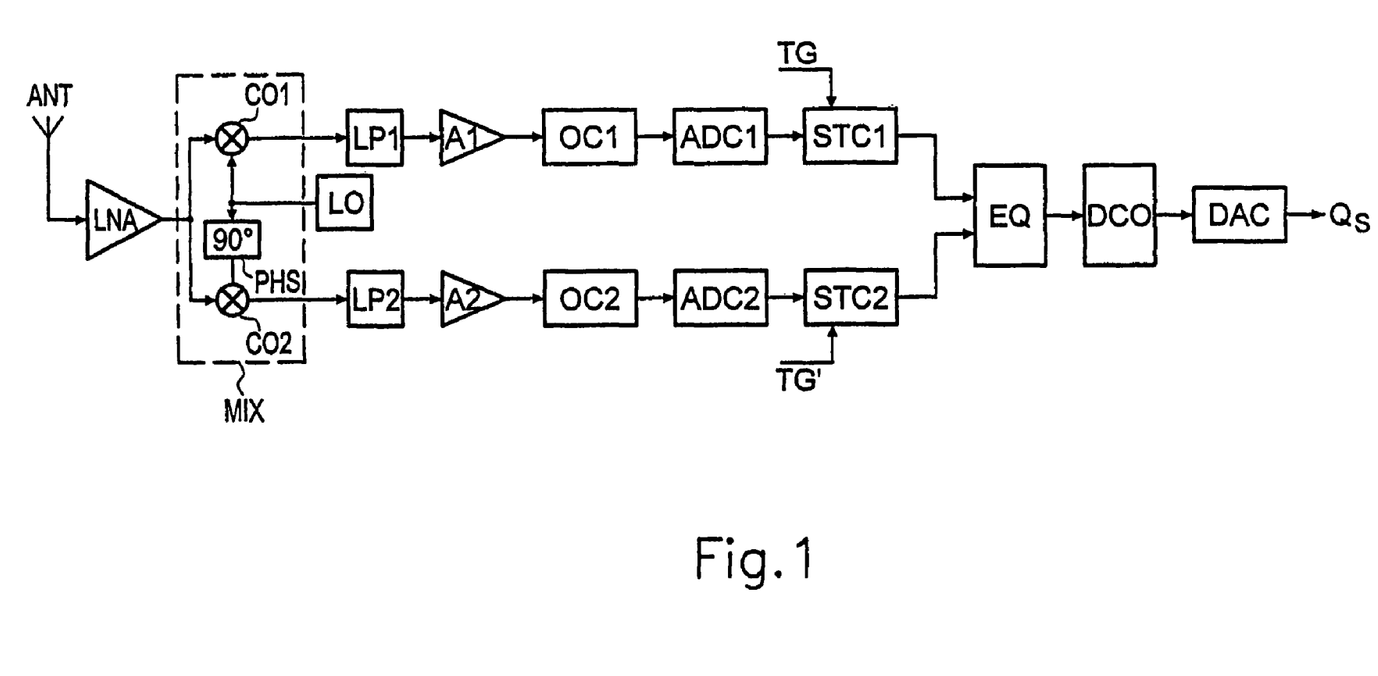
FIG. 1 shows a schematic illustration of a reception signal path in the heterodyne receiver concept, in the form of a block diagram.

FIG. 1 will be used to explain the principle of a heterodyne receiver, and shows the signal path in this receiver, in the form of a block diagram.

The receiver has an antenna ANT via which a radio signal is received and is passed to a low-noise amplifier LNA. The output of the amplifier LNA is passed to a mixer MIX, which directly down-mixes the received signal to a baseband, and splits the received signal into I and Q branches. For this purpose, the mixer MIX has two mixing stages CO1 and CO2, which are driven by the carrier frequency of the received signal, phase-shifted through 90° with respect to one another. The carrier frequency is produced in the oscillator LO, and is phase-shifted at the phase shifter PHS.

The two analog baseband outputs of the mixer MIX are spectrally formed in low-pass filters LP1 and LP2, respectively, and are amplified by means of respective amplifiers A1 and A2.

Optional analog DC offset connection stages OC1 and OC2 are illustrated in the signal paths downstream of the amplifiers A1 and A2, and these each correct the DC offset signal in the analog area. DC offset correction stages such as these are known in the prior art and, for example, prevent overdriving of the analog/digital converters ADC1 and ADC2 which are provided downstream from these stages in the signal path.

The analog/digital converters ADC1, ADC2 digitize the analog I and Q baseband signals, that is to say they produce the corresponding digital baseband signals.

The analog/digital converters ADC1, ADC2 are followed by physically identical correction stages STC1, and STC2, respectively, by means of which the method according to the invention is carried out. This means that these stages determine (in a manner which will be described in more detail later) the time profile of a step DC disturbance within a burst, and produce a step-corrected baseband signal at their output. The correction stages STC1 and STC2, respectively, require trigger signals TG, TG' for this purpose, indicating the time of a DC disturbance in the burst.

The step-corrected digital baseband signals are passed after digital filtering (not illustrated) to an equalizer EQ, which carries out adaptive equalization. In the process of adaptive equalization, the symbol interference which is introduced as a consequence of multipath propagation in the mobile radio channel is corrected taking into account the actual transmission characteristics on the mobile radio channel. This is done in the normal manner by using a channel estimator first of all to measure the transmission characteristics of the mobile radio channel (so-called channel estimation) and then by using the channel parameters (impulse response of the mobile radio channel) as determined in the channel estimation process to carry out adaptive data detection.

Since the signal to be transmitted is normally preprocessed by means of a channel coder in the transmitter for transmission via the mobile radio channel (the channel coder adds redundancy to the payload signal), an account decoder DCO is provided, which uses the redundant information to reduce the transmission errors. After subsequent source decoding (not illustrated), the digital signal is converted by means of a digital/analog converter DAC to an analog signal, and is passed to a message sink S (for example a loudspeaker).

Figure 2:
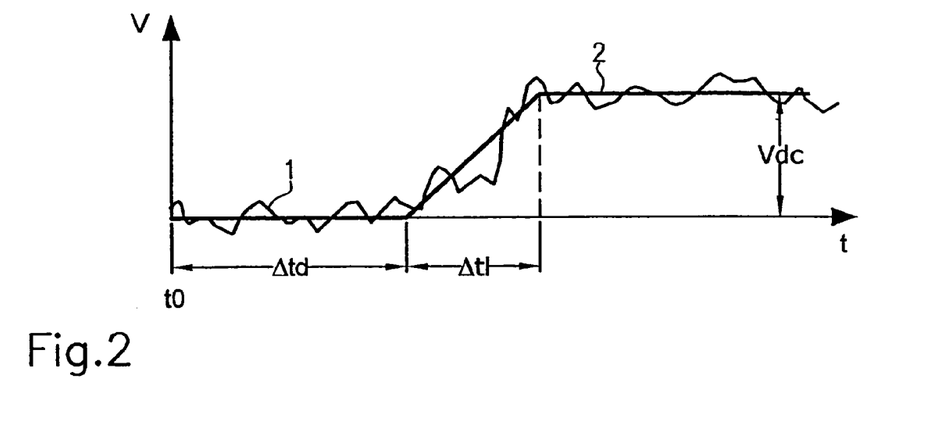
FIG. 2 shows a diagram illustrating a step DC disturbance as a voltage signal plotted against time.

FIG. 2 shows the time profile 1 of a step DC disturbance occurring in the baseband signal, illustrated as an analog voltage signal V plotted against time T. This disturbance has a characteristic profile 1, whose DC offset is first of all essentially constant, then changes significantly, and finally remains constant again after a later time. A disturbance such as this can be approximated in a simplified manner by means of a step signal 2 having a rising flank 2a with a greater or lesser gradient. This step signal 2 can be described by the following three parameters:

$\Delta td$: start time of the DC step with respect to a reference time t0

$\Delta t1$: time duration of the step rise

Vdc: magnitude of the DC step.

One characteristic of the step DC disturbances 1 considered here is that $\Delta t1$ is considerably shorter than the time duration Tb of a burst. A DC offset such as this is also referred to in the following text as a dynamic DC offset. The reference time t0 is always the start time of the burst in which the step DC disturbance 1 occurs.

Bursts are short subscriber signals whose time duration Tb is normally shorter than the typical time duration in which the transmission characteristics of the radio path change.

The use of bursts is a precondition for the use of a TDMA (Time Division Multiple Access) multiple access component. In this case, one and only one burst is normally transmitted in each time slot. For example, a GSM (Global System for Mobile communications) signal is formed from TDMA frames which contain eight time slots (bursts). However, bursts may also be used in a signal without a TDMA component.

An RF receiver is characterized with respect to the dynamic DC offset by the parameter AM suppression (AM_sup), which is quoted in decibels (dB). In an ideal RF receiver, which is not actually practical, the AM suppression is infinitely large, that is to say the magnitude of the DC step which occurs at the output STC1 or STC2 is always zero, irrespective of the magnitude of the level of an interference source in another channel. In the case of finite AM suppression, on the other hand, a DC step is produced at the input of the equalizer of the EQ, with a magnitude |Vdc|>0. This can be derived in accordance with the following relationship from the input signal level L_sig, the interference signal level L_interfer, the value of the AM suppression AM_sup and the maximum signal amplitude Vsig:

$$\frac{|Vdc|}{Vsig} = 10^{\frac{(L\_interfer - L\_sig - AM\_sup)}{20}}$$

According to ETSI: "GSM recommendations 05.05 Version 8.5.0", July 2000, a test for AM suppression using L_interfer=−31 dBm and the maximum permissible input signal level L_sig_max=−99 dBm is specified for GSM. (−99 dBm corresponds to a power which is −99 dB below 1 mW). Different values for L_sig_max are defined for GPRS (General Packet Radio Service) channels. For example, the value L_sig_max=−93 dBm is defined for the CS3RLC coding scheme, subject to the propagation condition RA250. Table 1 shows the relative DC step values Vdc/Vsig for "classical" GSM channels and for the GPRS CS3RLC coding scheme for the propagation condition RA250.

TABLE 1

| AM suppression [dB] | Vdc/Vsig [%] | |
| --- | --- | --- |
| | GSM (classical) | CS3RLC RA250 |
| 74 | 50.1 | 25.1 |
| 78 | 31.6 | 15.8 |
| 82 | 20.0 | 10.0 |
| 86 | 12.6 | 6.3 |
| 90 | 8.0 | 4.0 |
| 94 | 5.0 | 2.5 |

Figure 3A:
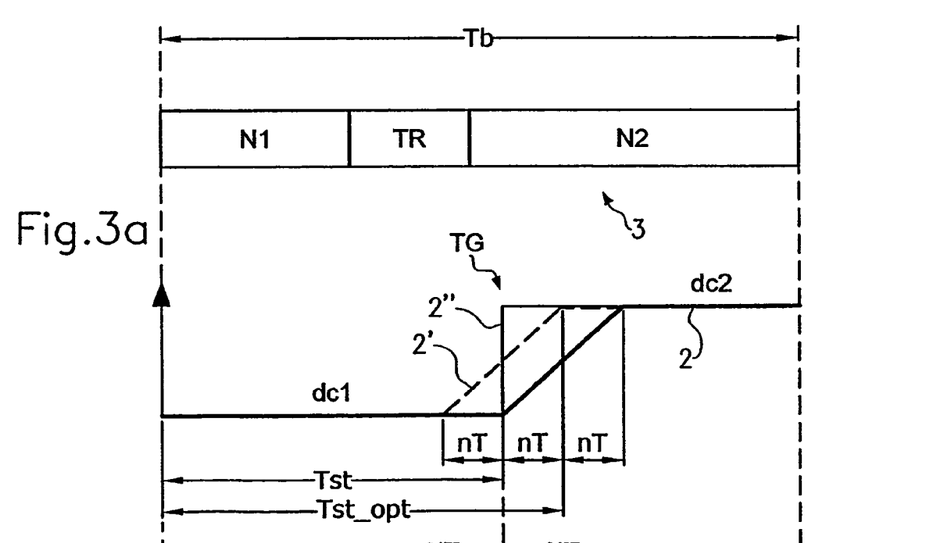
FIG. 3a shows a schematic illustration of a burst structure.
Figure 3B:
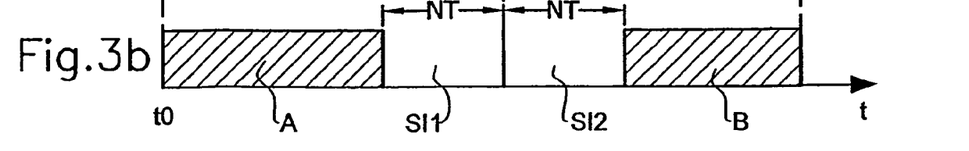
FIG. 3b shows a schematic illustration of step signals, which are calculated for a step DC disturbance, within the burst shown in FIG. 3a, as well as an illustration of sections of the burst which are used for DC offset estimation to the left and to the right of a trigger time.

FIGS. 3a and 3b show the method according to the invention for compensation for a step DC disturbance.

FIG. 3a shows one possible data structure for a burst 3. The GSM burst 3 considered here has a first message-carrying part N1, a training sequence TR in the form of a midamble, and a second message-carrying part N2. In the case of GSM, the burst parts N1 and N2 each have 57 data symbols (bits), and the training sequence TR has a length of 26 data symbols.

FIG. 3b explains how the step signal 2 of a step DC disturbance 1 is determined and reconstructed in the correction stages STC1 and STC2. The step signal 2 is initially unknown. The RF receiver detects a change in the DC component of the baseband signals in the I branch and Q branch, and then produces a trigger signal TG at the time Tst, calculated from the start of the burst t0. In principle, this trigger signal TG may be produced either in the analog or in the digital signal processing section.

Owing to inaccuracies in the trigger time Tst, it need not necessarily exactly reflect the time of the DC step 2a. For example, the trigger time Tst, as illustrated in FIG. 3b, may even occur at the start of the flank rise of the actual DC step 2a in baseband. An optimum trigger time Tst which occurs exactly at half the step height of the DC step 2a is illustrated by Tst_opt in FIG. 3b.

After the occurrence of a trigger signal TG at the time Tst, the magnitude Vdc of the DC step 2a is estimated as follows. Two guard time intervals SI1 and SI2 of N data symbols each are defined before and after the trigger time Tst, and the corresponding signal components are ignored in the estimation of the step magnitude Vdc. The number N is dependent on the time uncertainty of the trigger signal TG. The greater this uncertainty, the greater N must also be chosen to be. The guard time intervals SI1, SI2 may also have different lengths.

A first signal evaluation is then carried out from the burst start t0 to the start of the first guard time interval SI1 (that is to say in the shaded section A of the burst 3, see the lower part of FIG. 3b), and an estimated value dc1 is determined for the DC offset to the left of the trigger time Tst. A second signal evaluation is carried out starting at the end of the second guard time interval SI2 to the end of the burst 3 (shaded area B), and an estimated value dc2 is determined for the DC offset to the right of the trigger time Tst. The difference dc2−dc1 between these two DC offset values is the estimated step magnitude Vdc.

Various methods may be used to calculate the DC offset values dc1, dc2 for the burst subsections A and B, for example averaging or fitting the I and Q signal values into a circle.

A variable which provides information about the gradient of the step flank 2a is also required to calculate the step signal 2 of the step DC disturbance 1.

The simplest option is to predetermine the gradient of the step flank 2a by means of a step model using a parameter n. In the step model, the rise in the step flank extends over a time period 2nT, where T is referred to as the symbol time duration. n=0 corresponds to a sudden step rise, and greater values of n correspond to the DC step 2a having a flatter rise.

The time profile of the step DC disturbance 1 is calculated using these values for Tst, dc2, dc1 and n. For the trigger time Tst and n≠0 (step model as a ramp function) this is represented by the line 2', for the trigger time Tst and n=0 (step model with a sudden flank rise), this is represented by the line 2", and for the "correct" trigger time Tst_opt, it is represented by the bold line 2 (provided that dc2−dc1=Vdc has been determined correctly). In the illustration in FIG. 3b, the lines 2, 2' and 2" all converge away from the step flank 2a.

This clearly shows that the step magnitude dc2−dc1 is determined independently of the precise trigger time on the basis of the guard time intervals SI1, SI2. Errors in the initiation of the trigger time Tst with respect to Tst_opt result only in a shift in the calculated time profile 2' or 2" of the reconstructed DC disturbance relative to the DC step 2 along the time axis t.

Figure 4A:
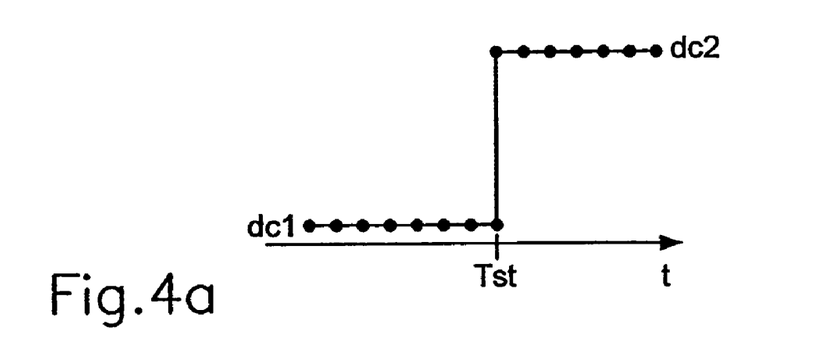
FIG. 4a shows a calculated time profile for a step DC disturbance based on a step model with a sudden flank rise.
Figure 4B:
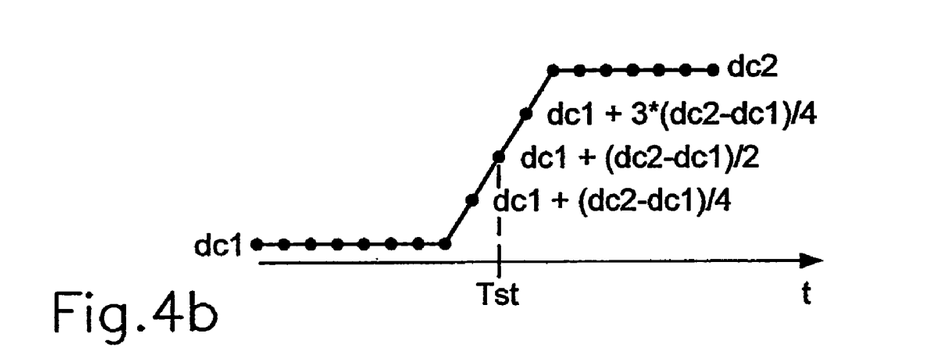
FIG. 4b shows a calculated time profile of a step DC disturbance based on a step model with a step flank rising as a ramp function.

FIGS. 4a and 4b show the estimated time profile of the step DC disturbance 1 for different step models. FIG. 4a is based on the step model with a sudden step rise (n=0). A step model which is based on a ramp function where n=2, and for which the step flank extends over five data symbols (four symbol time periods), is illustrated in FIG. 4b. Both illustrations show the DC offset values calculated for each data symbol in the form of points through which straight lines are passed. In the case of FIG. 4a, the trigger time Tst always occurs in the vertical step rise flank, while in FIG. 4b the step rise which is based on a ramp function is calculated in such a way that the flank of the DC step is at half its magnitude at the trigger time Tst. The DC offset values dc_st(i) within the step flank are thus calculated using the following relationship:

$$dc\_st(i)=dc1+i*(dc2-dc1)/2n \text{ where } i=0,\ldots,2n$$

In a final step, the DC offset values calculated in accordance with the above description over the entire burst 3 are subtracted from the digital baseband signal in order to compensate for the step DC disturbance 1 in the digital baseband signal. The subtraction is carried out for each individual burst in the correction stages STC1 and STC2.

The step-corrected baseband signal can be calculated iteratively in order to improve the accuracy of the trigger time Tst. This will be explained with reference to FIG. 5a for the step model with a sudden rise, and with reference to FIG. 5b for the step model with a step rise based on a ramp function. When the step-corrected baseband signal is produced iteratively, the DC step profile S0 for the determined trigger time Tst is calculated first of all, in the manner already described. Further DC step profiles $S_{-2}, S_{-1}, S_1$ and $S_2$ are then calculated in the same way for trigger times Tst−2T, Tst−T, Tst+T and Tst+2T to the left and right of Tst. The corresponding step profiles are shown for the two step models in FIGS. 5a and 5b.

Figure 5A:
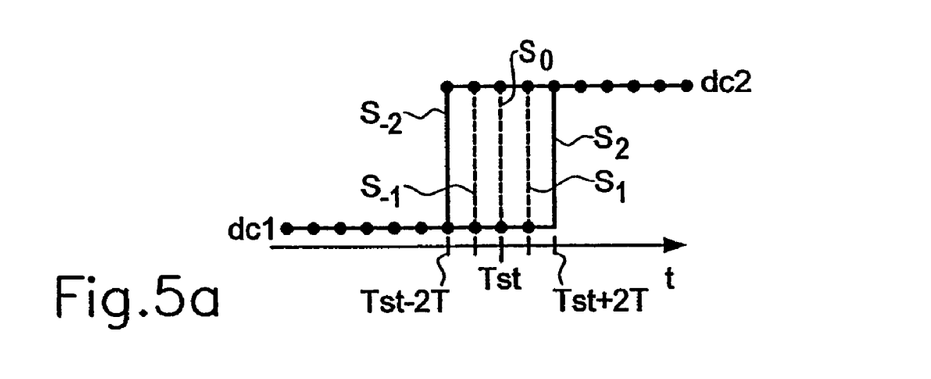
FIG. 5a shows an illustration of various time profiles corresponding to FIG. 4a for production of the step-corrected baseband signal by means of various time profiles which are calculated in accordance with a first aspect of the invention.
Figure 5B:
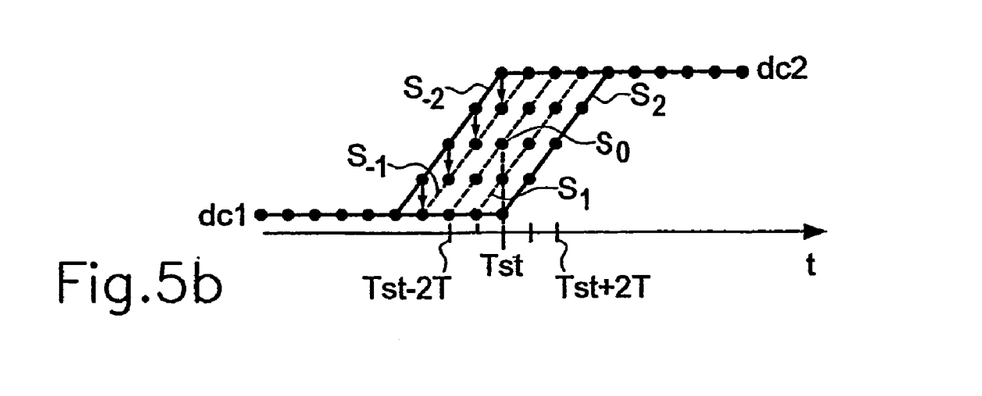
FIG. 5b shows an illustration of various time profiles corresponding to FIG. 4b, for production of the step-corrected baseband signal by means of various time profiles which are calculated in accordance with the first aspect of the invention.

The digital baseband signal is then corrected using each of the step profiles $S_{-2}, S_{-1}, S_0, S_1$ and $S_2$.

The two or more step-corrected digital baseband signals obtained in this way are assessed in a subsequent step. The assessment process is generally carried out by selecting that step-corrected baseband signal which has the best signal quality downstream from the equalizer EQ, and by using this for the rest of the signal processing.

If the step flank is located in the area of the training sequence TR in the data burst, there is one simple way to determine this best-corrected baseband signal by correlation of each of the data values of the step-corrected baseband signals with the data values of the known training sequence TR. That step-compensated data signal which gives the best correlation result is then used for the rest of the signal processing.

FIGS. 5a and 5b show that only a small number of data values in the area of the step flank need be recalculated in order to calculate the various DC step profiles. In consequence, the calculation of the various step-corrected baseband signals involves only a relatively low level of computation complexity.

A further advantageous method according to the invention comprises the DC step correction process not necessarily being carried out, but being carried out only when the trigger time Tst is sufficiently far away from the burst boundaries. First time intervals (not illustrated) which are located at the start and at the end of the burst are defined for this purpose. If the trigger time Tst occurs within one of these first time intervals, no DC step correction is carried out in the described manner, and, instead of this, the DC offset is treated as constant and is corrected in the normal way for the entire burst. This constant DC offset is determined, for example, on the basis of data symbols which are located in the central area of the burst, and are removed from the digital baseband signal by subtraction.

That time interval in which the training sequence TR occurs in the burst 3 is referred to in the following text as the second time interval. The two measures explained above (iterative production of the step-corrected baseband signal and DC step compensation as a function of the position of Tst) can then advantageously be combined in the following manner:

Tst is in One of the First Intervals:

No DC step compensation is carried out but, if necessary, only compensation for a constant DC offset;

Tst is in the Second Time Interval:

Since the training sequence TR is required to estimate the impulse response of the mobile radio channel, DC step compensation with particularly high time accuracy is required in this situation. Iterative DC step compensation is therefore used.

Tst is Neither in the First nor in the Second Time Intervals:

The described "normal" DC step compensation is carried out using one of the step models that have been mentioned.

Figure 6:
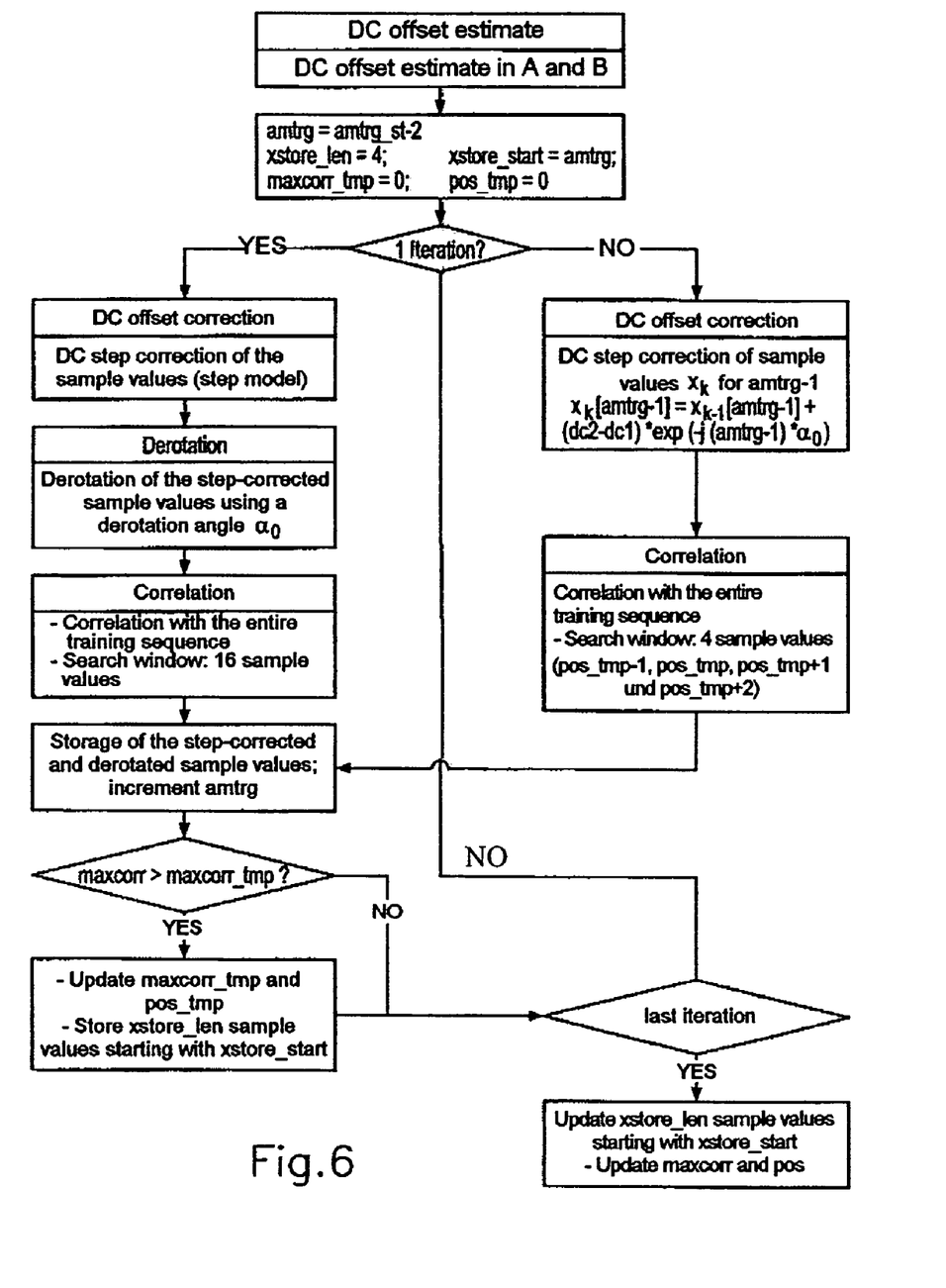

FIG. 6 shows a detailed flowchart for the iterative calculation of a step-compensated digital baseband signal.

In a first step, the DC offset is estimated separately in burst sections A and B (that is to say taking into account the guard time interval).

In a next step, an initialization process is carried out. The discrete time, measured in units of the symbol time duration T, is denoted amtrg. The variable amtrg_st corresponds to Tst/T and indicates the number of the data symbol with respect to which the trigger signal occurs. The following initializations are chosen:
amtrg=amtrg_st−2
xstore_len=4
maxcorr_tmp=0
xscore_start=amtrg
pos_tmp=0

In this case, xstore_len denotes the length 2N of the two guard time intervals, maxcorr_tmp denotes a temporary correlation value, xstore_start denotes a discrete start time for the storage of data symbols, and pos_tmp denotes a temporary position variable.

In a next step, a check is carried out to determine whether the first iteration should be carried out. If this is the case, a step correction for the digital baseband signal is carried out for all sample values $x_k$, using the step model with a sudden step rise.

In a next step, the step-corrected sample values are derotated using a derotation angle $\alpha_0$. The derotation angle $\alpha_0$ is dependent on the modulation type that is used.

The derotated step-corrected sample values are then correlated with the entire training sequence TR. The search window comprises 16 sample values. A value maxcorr is obtained as the correlation result.

In a next step, the step-corrected and derotated sample values are stored, and amtrg is incremented.

The condition maxcorr>maxcorr_tmp is then checked.

If this condition is satisfied, the values for maxcorr_tmp and pos_tmp are updated, and the central xstore_len sample values are stored, starting with xstore_start. If the above condition is not satisfied, this step is omitted.

In a next step, a check is carried out and determined whether this is actually the final iteration. Since this is not yet the case in the first iteration, the method jumps back to the already mentioned condition step once again, in which a check is carried out to determine whether this is the first iteration.

This is not the case. In a next step, the method then carries out a DC offset correction for the sample values $x_k$ relating to the discrete time amtrg−1. The equation that is used for this purpose is:

$$x_k[amtrg-1]=x_{k-1}[amtrg-1]+(dc2-dc1)*\exp(-j(amtrg-1)*\alpha_0)$$

where j denotes the imaginary unit.

The correlation of the step-corrected and derotated sample values calculated in this way with the entire training sequence TR is carried out in the next step. Four sample values, at the positions pos_tmp−1, pos_tmp, pos_tmp+1 and pos_tmp+2 are required for the search window.

After the correlation, the step-corrected and derotated sample values are stored in the step which has already been described for the first iteration, and the present correlation result is compared with the previous correlation result. Depending on the result of this comparison, the storage step which has already been described for the first iteration is then carried out.

The iteration loop is continued until the final iteration has been reached. In this case, the central xstore_len sample values, starting with xstore_start, are updated. The values for maxcorr and pos are also updated.

The exemplary embodiment, explained with reference to FIG. 6, for iterative production of a step-corrected baseband signal on the basis of the step model with a sudden step rise can be transferred in an analogous manner to the step model in which the step flank rises as a ramp function. The major differences are that a further variable ddc=(dc2−dc1)/4 must be defined in the initialization step and xstore_len=7 and xstore_start=amtrg−1 must be set. The calculation rule for the derotated DC offset correction values in the loop is then, for i=amtrg−2, . . . , amtrg+1

$$x_k[i]=x_{k-1}[i]+ddc*\exp(-j*i*\alpha_0)$$

The described method has been investigated with the COSSAP bit true model for different values of the AM suppression AM_sup. The logical channels GSM TCHHS, GSM SCH and GPRS CS3RLC were simulated. The following simulation conditions were set:
Environment: country area (RA: rural area)
Speed: 250 km/h
Number of frames: 10000
Input signal level: −99 dBm (TCHHS/SCH) or −93 dBm (CS3RLC)
Interference level: −31 dBm
Δtd: 73T (i.e. 73 symbols)
Δt1: 4.5T (i.e. 4.5 symbols)
N: 5T (i.e. 5 symbols)
Tst error: −2T (i.e. −2 symbols)

As can be seen, an improvement of more than 3 dB (for AM_sup=78 dB) can be achieved for a low level of AM suppression (that is to say a large DC step). If the AM suppression is very low (AM_sup=74 dB), convergence could be achieved in the simulation only by carrying out the DC step compensation according to the invention. If the AM suppression is very high (that is to say the DC step disturbance is very small), the DC step compensation leads, owing to inaccurate DC estimation, to a somewhat poorer result than DC compensation ignoring the step.

We claim:

1. A method to compensate for a step DC disturbance in a digital baseband signal in a homodyne radio receiver, comprising the following steps:
   a) determining a time Tst at which the step DC disturbance occurs within a burst;
   b) calculating various time profiles of the step DC disturbance for two or more times around Tst;
   c) calculating these profiles from the digital baseband signal in order to produce the various step-corrected baseband signal versions;
   d) evaluating the various step-corrected baseband signal versions which are obtained, on the basis of a predetermined criterion;
   e) selecting one of the step-corrected baseband signal versions as a function of the evaluation result; and
   f) producing the selected step-corrected baseband signal in order to compensate for the step DC disturbance.

2. The method as claimed in claim 1, wherein the following additional step is carried out before step b):
   estimating a magnitude of the step DC disturbance by separate evaluation of the baseband signal at the times before and after Tst;
   wherein the calculation process in step b) takes the estimated magnitude of the step DC disturbance into account; and wherein the calculation in step c) is carried out by subtracting the calculated time profiles from the digital baseband signal, in order to produce the various step-corrected baseband signal versions.

3. The method as claimed in claim 1, further comprising the steps of:
   predetermining first time intervals with a specific interval length at the start and/or at the end of the burst, and
   carrying out the correction for the step DC disturbance only when Tst is outside this first time interval.

4. The method as claimed in claim 1, wherein when Tst is within a second time interval in the burst, the step-corrected baseband signal is produced by means of various time profiles.

5. The method as claimed in claim 4, wherein
   the second time interval is a time interval in which a training sequence occurs,
   the various step-corrected baseband signal versions are correlated with the training sequence which is known in the receiver, and
   that step-corrected baseband signal version which has the best correlation result is selected as the step-corrected baseband signal.

6. The method as claimed in claim 2, wherein
   the magnitude of the step DC disturbance is calculated taking into account a guard time interval around the determined time Tst, with the baseband signal within the guard time interval being ignored in the estimate of the magnitude of the DC disturbance.

7. The method as claimed in claim 1, wherein
   the time profile or the time profiles of the step DC disturbance is/are calculated on the basis of a first step model in which a sudden rise occurs in the step flank for a specific data symbol in the digital baseband signal.

8. The method as claimed in claim 1, wherein
   the time profile or the time profiles of the step DC disturbance is/are calculated on the basis of a second step model, in which the step flank for a specific data symbol in the digital baseband signal rises as a ramp function over a time period of two or more data symbols in the digital baseband signal.

9. A method to compensate for a step DC disturbance in a digital baseband signal in a homodyne radio receiver, comprising the following steps:
   a) determining a time Tst at which the step DC disturbance occurs within a burst;
   b) evaluating a position of the Tst within the burst being considered;
   c) deciding on the basis of the position of Tst and/or on the basis of which calculation rule whether the production of a step-corrected baseband signal should be carried out; and
   if a step-corrected baseband signal is to be generated,
   d) calculating the time profile of the step DC disturbance and calculating this profile from the digital baseband signal in order to produce the step-corrected baseband signal as a function of the calculation rule which was selected in step c); and
   (e) producing the selected step-corrected baseband signal in order to compensate for the step DC disturbance.

10. The method as claimed in claim 9, wherein step d) includes the following steps:
    d1) estimating the magnitude of the step DC disturbance by separate evaluation of the baseband signal at the times before and after Tst;
    d2) calculating a time profile of the step DC disturbance taking into account the determined time Tst and the estimated magnitude of the step DC disturbance; and
    d3) subtracting the calculated time profile of the step DC disturbance from the digital baseband signal, in order to produce the step-corrected baseband signal.

11. The method as claimed in claim 9, further comprising the steps of:
    predetermining first time intervals with a specific interval length at the start and/or at the end of the burst, and
    carrying out a correction for the step DC disturbance only when Tst is outside this first time interval.

12. The method as claimed in claim 9, wherein when Tst is within a second time interval in the burst, the step-corrected baseband signal is produced by means of various time profiles.

13. The method as claimed in claim 12, wherein
    the second time interval is a time interval in which a training sequence occurs,
    the various step-corrected baseband signal versions are correlated with the training sequence which is known in the receiver, and that step-corrected baseband signal version which has the best correlation result is selected as the step-corrected baseband signal.

14. The method as claimed in claim 10, wherein
the magnitude of the step DC disturbance is calculated taking into account a guard time interval around the determined time Tst, with the baseband signal within the guard time interval being ignored in the estimate of the magnitude of the DC disturbance.

15. The method as claimed in claim 9, wherein
the time profile or the time profiles of the step DC disturbance is/are calculated on the basis of a first step model in which a sudden rise occurs in the step flank for a specific data symbol in the digital baseband signal.

16. The method as claimed in claim 9, wherein
the time profile or the time profiles of the step DC disturbance is/are calculated on the basis of a second step model, in which the step flank for a specific data symbol in the digital baseband signal rises as a ramp function over a time period of two or more data symbols in the digital baseband signal.

* * * * *